United States Patent
Dixon, III et al.

(10) Patent No.: US 7,047,522 B1
(45) Date of Patent: May 16, 2006

(54) METHOD AND SYSTEM FOR VERIFYING A COMPUTER PROGRAM

(75) Inventors: Walter Dixon, III, Delanson, NY (US); Brian Murren, Clifton Park, NY (US)

(73) Assignee: General Electric Capital Corporation, Stamford, CT (US)

( * ) Notice: Subject to any disclaimer, the term of this patent is extended or adjusted under 35 U.S.C. 154(b) by 641 days.

(21) Appl. No.: 09/845,734

(22) Filed: Apr. 30, 2001

(51) Int. Cl.
G06F 9/44 (2006.01)

(52) U.S. Cl. ............. 717/131; 717/124; 717/126; 717/127; 717/132; 710/2; 710/3; 710/38

(58) Field of Classification Search ............. 717/116, 717/124, 126, 127, 128, 101, 120, 131, 140, 717/130, 104, 139, 151, 132; 707/7, 103 R, 707/1, 3, 10, 100; 718/106; 714/38; 709/217, 709/202; 710/14, 38, 3, 12; 712/234

See application file for complete search history.

(56) References Cited

U.S. PATENT DOCUMENTS

| | | | | |
|---|---|---|---|---|
| 4,672,535 A | * | 6/1987 | Katzman et al. | 710/38 |
| 4,752,897 A | * | 6/1988 | Zoeller et al. | 702/40 |
| 5,313,551 A | * | 5/1994 | Labrousse et al. | 711/149 |
| 5,365,606 A | * | 11/1994 | Brocker et al. | 719/331 |
| 5,448,731 A | * | 9/1995 | Wang et al. | 718/103 |
| 5,651,111 A | * | 7/1997 | McKeeman et al. | 714/38 |
| 5,754,860 A | * | 5/1998 | McKeeman et al. | 717/124 |
| 5,925,109 A | * | 7/1999 | Bartz | 710/14 |
| 5,946,681 A | * | 8/1999 | Shorter | 707/3 |
| 5,970,244 A | * | 10/1999 | Nagahashi et al. | 717/124 |
| 6,065,009 A | * | 5/2000 | Leymann et al. | 707/10 |
| 6,071,317 A | * | 6/2000 | Nagel | 717/128 |
| 6,085,198 A | * | 7/2000 | Skinner et al. | 707/103 R |
| 6,226,783 B1 | * | 5/2001 | Limondin et al. | 717/104 |
| 6,243,737 B1 | * | 6/2001 | Flanagan et al. | 709/202 |
| 6,253,374 B1 | * | 6/2001 | Dresevic et al. | 717/126 |
| 6,275,976 B1 | * | 8/2001 | Scandura | 717/120 |
| 6,301,584 B1 | * | 10/2001 | Ranger | 707/103 R |
| 6,385,496 B1 | * | 5/2002 | Irwin et al. | 700/87 |
| 6,405,364 B1 | * | 6/2002 | Bowman-Amuah | 717/101 |
| 6,519,766 B1 | * | 2/2003 | Barritz et al. | 717/130 |

(Continued)

OTHER PUBLICATIONS

Instruction Cache Fetch Policies for Speculative Execution, Lee et al, ACM, 1995.*

(Continued)

*Primary Examiner*—Chameli C. Das
(74) *Attorney, Agent, or Firm*—Buckley, Maschoff & Talwalkar LLC

(57) ABSTRACT

A method and system for verifying resolution of attributes of a computer program. The verification system analyzes a command-based computer program prior to runtime to determine whether the input attributes associated with a command would be properly resolved prior to execution of that command at runtime. During verification, the verification system processes the commands of the program in sequence. For each input attribute of a command, the verification system identifies a source (e.g., output attribute of a command) of the value for the input attributes. The verification system then determines whether that source would be properly resolved during execution of the computer program.

36 Claims, 17 Drawing Sheets

U.S. PATENT DOCUMENTS

| | | | |
|---|---|---|---|
| 6,529,948 B1 * | 3/2003 | Bowman-Amuah | 709/217 |
| 6,658,450 B1 * | 12/2003 | Balakrishnan et al. | 718/106 |
| 6,671,798 B1 * | 12/2003 | Puziol et al. | 712/234 |
| 6,687,707 B1 * | 2/2004 | Shorter | 707/103 R |
| 6,708,169 B1 * | 3/2004 | Berry et al. | 707/7 |
| 6,708,173 B1 * | 3/2004 | Behr et al. | 707/10 |
| 6,728,949 B1 * | 4/2004 | Bryant et al. | 717/127 |
| 6,754,670 B1 * | 6/2004 | Lindsay et al. | 707/100 |
| 6,820,137 B1 * | 11/2004 | Nakamura et al. | 710/1 |
| 6,820,255 B1 * | 11/2004 | Babaian et al. | 717/151 |
| 6,968,542 B1 * | 11/2005 | Bagley et al. | 717/139 |

OTHER PUBLICATIONS

Concurrent Runtime Monitoring of Formally specified Programs, Sankar et al, IEEE, Mar. 1993.*

Incorporating Probabilistic Reasoning in a Reactive Program Debugging System, Burnell et al, IEEE, 1994.*

* cited by examiner www.acme.com/login

Asset Catalog

User Name _____
Password  _____

Submit

*Fig. 4* www.acme.com/createasset

Asset Catalog          ( Main Menu )

Asset ID       _____
    Asset Type    _____
    Asset Description _____
    Asset Price   _____
      •
      •
      •

( Create Asset )

METHOD AND SYSTEM FOR VERIFYING A COMPUTER PROGRAM

TECHNICAL FIELD

The described technology relates generally to verifying a computer program and particularly to verifying an application program that is defined by interactions.

BACKGROUND

Computer programs are traditionally developed by the writing of source code for components of the program that include a main module and various other modules functions, or subroutines that are invoked by the main module. The source code of components of computer programs are typically developed specifically for the domain of one computer program. As a result, one computer program might not be able to use components developed specifically for another computer program. Although some utility components (e.g., sort routines) can be reused by different computer programs, they are typically very low-level components that are not related to the domain of the computer program. Because of the inability to reuse high-level components for multiple computer programs, the cost of developing a computer program can be quite high. In addition, because new components are developed for each new computer program, the reliability of the new computer programs is unproved.

Many techniques have been developed to facilitate the reusability and reliability of software components. One well-known technique is object-oriented programming. Object-oriented programming allows a programmer to define a type of component, known as an "object." Each type of object has a defined interface with a defined behavior. A programmer can develop a computer program to use the interfaces of objects that have been developed by other programmers to provide that behavior within the computer program. The behavior of an object is provided by methods (or member functions), and the data of an object is provided as attributes (or data members). Some object-oriented programming languages allow attributes to be set and retrieved directly (e.g., "object.attribute1=15"), while other object-oriented programming languages only allow attributes to be set and retrieved indirectly through methods (e.g., "object-.setAttribute1(15)"). The methods for setting attributes are referred to as "set methods" and for retrieving attributes are referred to as "get methods."

Although object-oriented programming techniques have helped increase the reusability and reliability of software components, it is still very expensive to develop a computer program even using these reusable components. Part of the expense is attributable to the need of computer programmers to know and understand all the interfaces of the components in order to integrate the components into the desired computer program. It would be desirable to have a programming technique that would increase reusability and reliability of the software components while reducing the overall expense of developing computer programs. Moreover, it would be desirable to have development time tools that would assist a programmer when developing with this new programming technique.

BRIEF DESCRIPTION OF THE DRAWINGS

FIG. 4 illustrates a web page that is provided by the logon interaction of the asset catalog application.

FIG. 6 illustrates a web page that is provided by the create-asset interaction of the asset catalog application.

DETAILED DESCRIPTION

Figure 1:
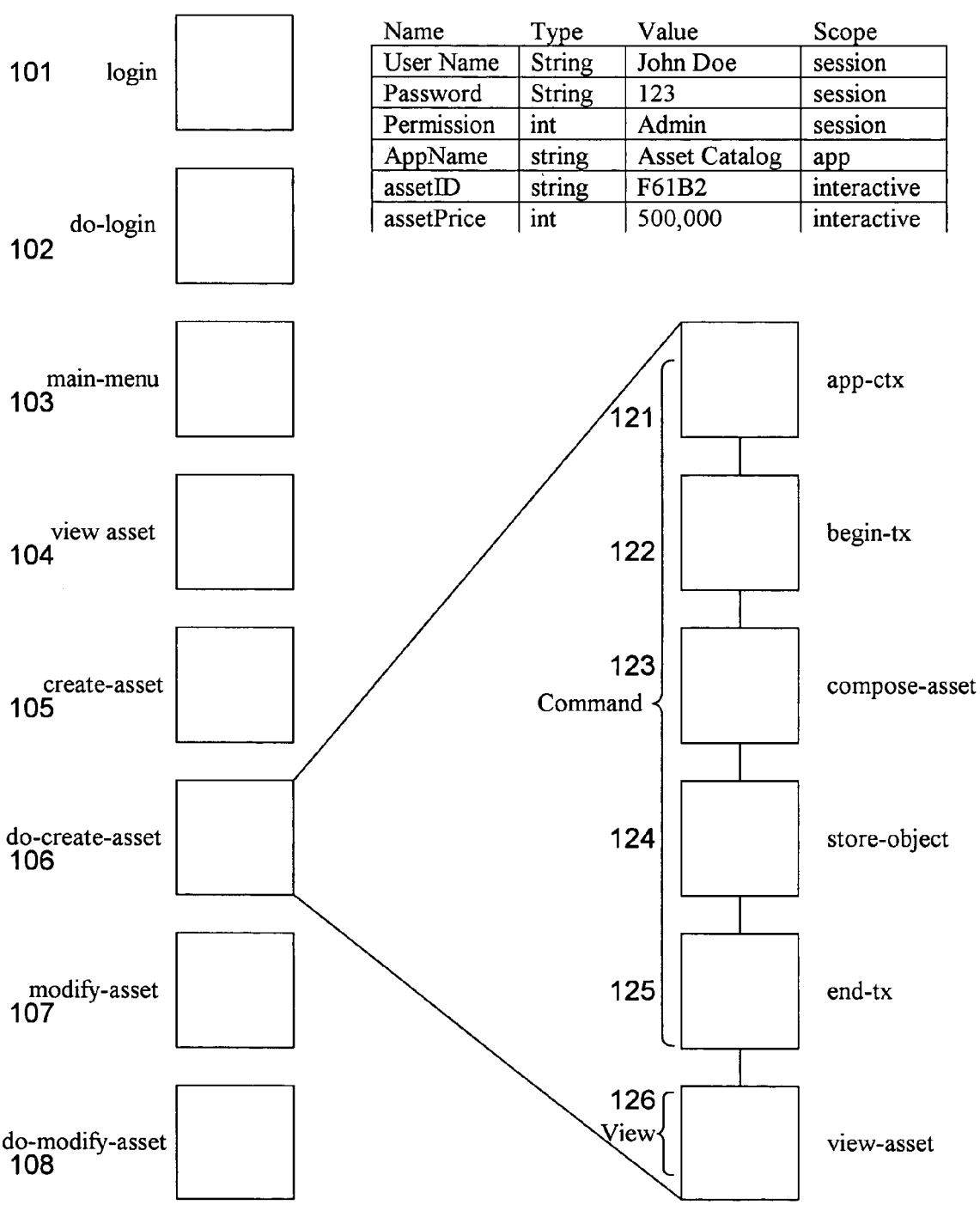
FIG. 1 is a block diagram illustrating an application program and attribute store of the execution system.

A method and system for verifying resolution of attributes of commands of a computer program is provided. In one embodiment, the verification system analyzes a command-based computer program prior to runtime to determine whether the input attributes associated with its commands would be properly resolved prior to execution of the commands at runtime. A command specifies a function that is part of the program, and the attributes of the command correspond to input and output parameters of the command. The verification system processes the commands of the program in sequence. For each input attribute of a command, the verification system identifies a source (e.g., output attribute of another command) of the value for the input attribute. The verification system then determines whether that source would itself be resolved to during execution of the computer program at the time the command is ready to be performed. If the verification system determines that the source would not be resolved, then the verification system indicates that that input attribute would also not be properly resolved at runtime. A programmer may then modify the computer program to ensure that input attribute would be resolved when the command is ready to be performed. In this way, attribute resolution problems that would occur during runtime of the program can be identified and corrected during development of the computer program. In one embodiment, the verification system verifies command-based programs as defined and works in conjunction with an execution system that is described in U.S. patent application Ser. No. 09/681,567, entitled "Method and System for Executing a Computer Program," which is being filed concurrently and which is hereby incorporated by reference.

Execution System Overview

The execution system uses interaction-based definitions of the computer programs that it executes. Each computer program is defined by a series of zero or more interaction definitions that are based on a request-response model. Each interaction definition includes command definitions and view definitions. A command definition defines a command whose functionality may be represented by an object that has various attributes and that provides the behavior of that command. A view definition defines a view that provides a response to a request. Each interaction of a computer program is associated with a certain type of request. When the execution system receives a request, it identifies the associated interaction and then performs the behavior of the commands defined by that interaction. The execution system automatically instantiates an object associated with each command defined in a command definition. Prior to performing the behavior of a command, the execution system prepares the instantiated object by identifying each of the input attributes of that object (e.g., by retrieving the class definition of the object) and setting the input attributes (e.g., by invoking set methods) of the object based on the current value of the attributes in an attribute store. After setting the attribute values, the execution system performs the behavior of the object (e.g., by invoking a perform method of the object). After the behavior is performed, the execution system extracts the output attributes of the object by retrieving the values of the output attributes (e.g., by invoking get methods of the object) and storing those values in the attribute store. Thus, the attribute store stores the output attributes of each object which are then available to set the input attributes of other objects. In one embodiment, the execution system serially performs the instatiation, preparation, performance, and extraction for each command. One skilled in the art would appreciate that in certain instances the execution of commands can be in parallel depending on the data dependencies of the commands. Because the execution system automatically prepares an object based on the current values in the attribute store and extracts attribute values after performing the behavior of the object, a programmer does not need to explicitly specify the invocation of methods of objects (e.g., "object.setAttribute1(15)") when developing a computer program to be executed by the execution system. In an alternate embodiment, the execution system may initially instantiate all the objects of each interaction of a computer program. Whenever an object is performed as part of an interaction, the execution system extracts the output attributes of that object by retrieving the values of the output attributes and setting the input attributes of all of the instantiated objects that correspond to the output attributes. In this way, the execution system does not need to use an attribute store.

FIG. 1 is a block diagram illustrating an application program and attribute store of the execution system. Sample application 100 allows the user to view, create, and modify information relating to assets (e.g., products) that are stored in an electronic catalog. The name of the application is "asset catalog." The application comprises eight interactions: login 101, do-login 102, main-menu 103, view-asset 104, create-asset 105, do-create-asset 106, modify-asset 107, and do-modify-asset 108. When the execution system receives a request (e.g., do-create-asset), it invokes the corresponding interaction of the application to perform the behavior and return a view so that subsequent requests of the application can be made. Each interaction is defined by a series of zero or more command definitions and a view definition. Each command definition defines a command (e.g., object class) that provides a certain behavior. The do-create-asset interaction includes five command definitions: app-ctx 121, begin-tx 122, compose-asset 123, store-object 124, and end-tx 125. The do-create-asset interaction is invoked after a user specified the values of the attributes of a new asset to be added to the asset catalog. The app-ctx command retrieves the current application context of the application. The application context may be used by the interaction to access certain application-wide information, such as user profile settings. The begin-tx command indicates that a transaction for the asset catalog is beginning. The compose-asset command creates an object that identifies the value of the attributes of the asset to be added to the asset catalog. The store-object command stores an entry identified by the created object in the asset catalog. The end-tx command indicates that the transaction for the asset catalog is ending. The interaction also includes a view definition 126 that identifies that a view named "view-asset" is to be invoked to prepare a response (e.g., display page) to return to the user. The attribute store 130 contains an entry for each attribute that has been defined by an interaction of the application that has been invoked. The attribute store identifies the name of the attribute, the type of the attribute, the scope of the attribute, and the current value of the attribute. For example, the last entry in the attribute store has the name of "assetPrice," the type of "integer," the value of "500,000," and the scope of "interaction." The scope of an attribute indicates the life of the attribute. An attribute with the scope of interaction (also known as "request") has a life only within the interaction in which it is defined. An attribute with the scope of session has a life only within the current session (e.g., logon session) of the application. An attribute with the scope of application has life across executions of the application. When the execution system receives a do-create-asset request, it invokes the do-create-asset interaction. The execution system first instantiates the app-ctx object defined in the interaction, prepares the object by setting its attributes based on the current values of the attribute store, performs the behavior of the object by invoking a perform method of the object, and extracts the attribute values of the object by getting the attribute values and storing them in the attribute store. The execution system then instantiates the begin-tx object defined by the interaction, prepares the object by setting its attribute values based on the current values of the attribute store, performs the behavior of the object by invoking a perform method of the object, and extracts the attribute values of the object by getting the attribute values and storing them in the attribute store.

The execution system repeats this process for the compose-asset object, the store-object object, and the end-tx object. The execution system then invokes the view-asset, which in this example may be a Java server page ("JSP") that retrieves the values of the attributes of the asset from the attribute store and provides a display page showing those attribute values.

Figure 2:
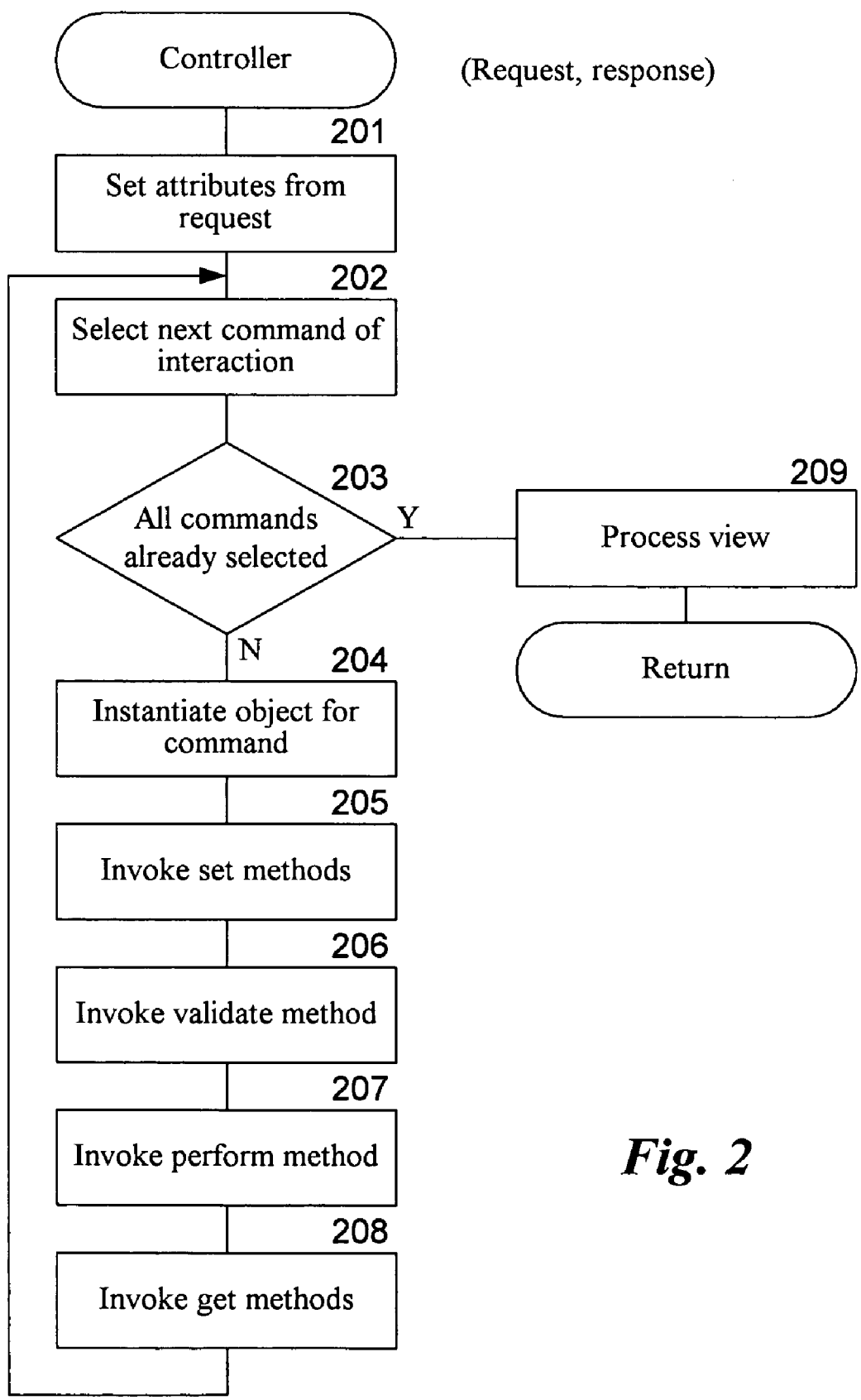
FIG. 2 is a flow diagram illustrating the overall processing of a controller component of the execution system.

FIG. 2 is a flow diagram illustrating the overall processing of a controller component of the execution system. The controller is invoked to process a request and return a response (e.g., display page). The execution system may be used by a server system in a client/server environment, such as the World Wide Web. The WWW uses a request-response model in which HTTP-request messages are sent by client systems to server systems. The server systems respond with HTTP-response messages, which may define web pages (e.g., HTML document) that are to be displayed to users at the client systems. In block 201, the controller sets the values of the attributes that are identified in the passed request in the attribute store. For example, a view-asset request may include the value for an "assetID" attribute that uniquely identifies an asset that is currently stored in the asset catalog. The request may be in the form of an HTTP-request message with the attributes specified as parameters. In blocks 202–208, the controller loops processing each command of the interaction associated with the passed request. In block 202, the controller selects the next command of the interaction associated with the passed request, starting with the first command. In decision block 203, if all the commands have already been selected, then the controller continues at block 209, else the controller continues at block 204. In block 204, the controller instantiates an object associated with the selected command. The object class associated with the command is specified in the command definition of the interaction. In block 205, the controller prepares the object by retrieving the values of the input attributes of the object from the attribute store and invoking the set methods of the object to set the values of the input attributes. In block 206, the controller invokes a validate method of the object to determine whether the current values of the input attributes of the object will allow the behavior of the object to be performed correctly. If the validate method indicates that the behavior cannot be performed correctly, then the controller generates an exception and skips further processing of the commands of the interaction. In block 207, the controller invokes the perform method of the object to perform the behavior of the object. In block 208, the controller extracts the values of the output attributes of the object by invoking the get methods of the object and then setting the values of the corresponding attributes in the attribute store. The controller then loops to block 202 to select the next command of the interaction. In block 209, the controller processes the view defined in the view definition of the interaction and then returns the response provided by the view.

Figure 3:
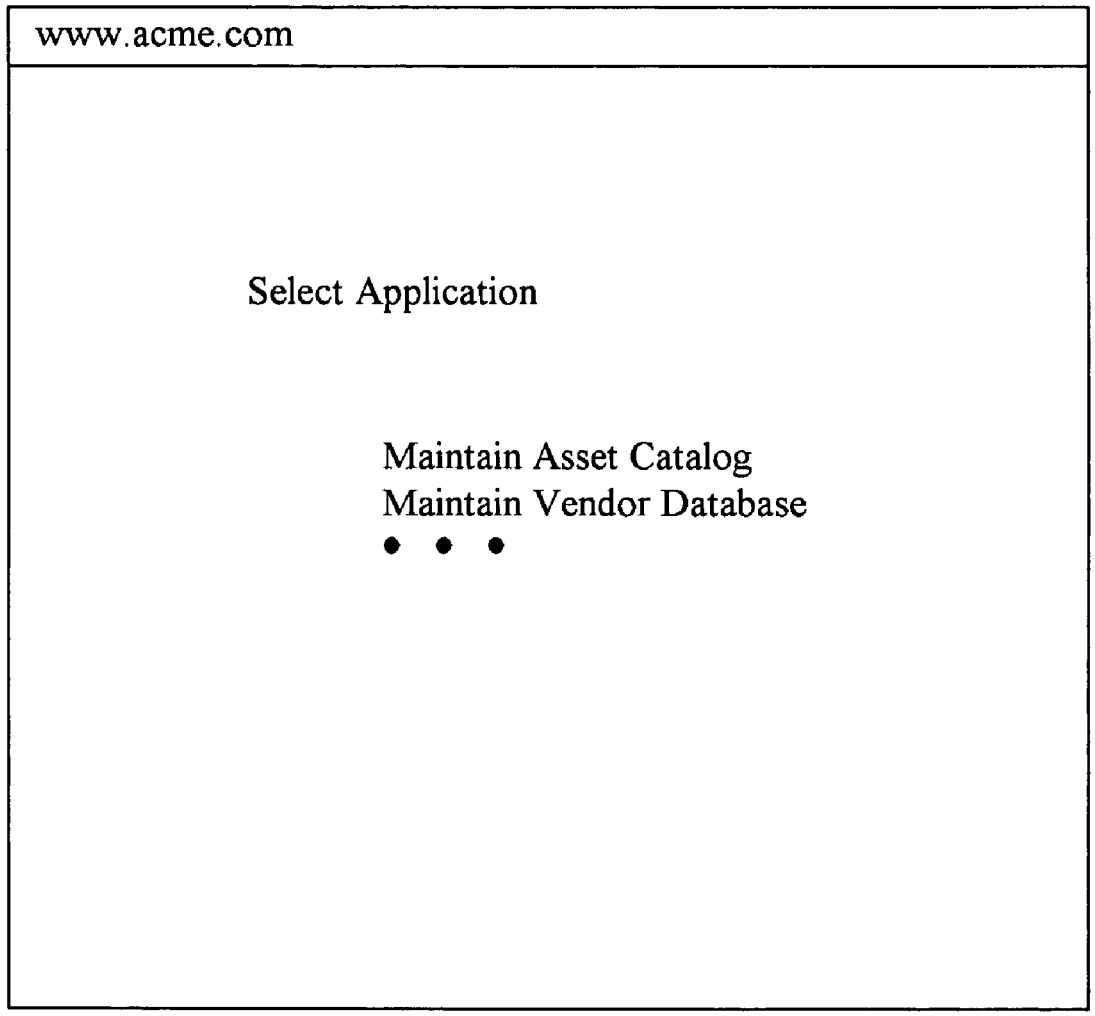
FIG. 3 illustrates a web page that allows the user to select an application program to execute.

FIGS. 3–6 are display pages illustrating the interaction between a user and an application program. These display pages are displayed at a client system by a web browser. In this example, the application is web-based and the display pages are web pages (e.g., HTML documents). FIG. 3 illustrates a web page that allows the user to select an application to execute. In this example, the user can select the application identified as "maintain asset catalog" or the application identified as "maintain vendor database." As indicated by the ellipsis, the user may be provided with many other applications to select.

When the user selects an application, an HTTP-request message is sent from the client system to the server system of the web site. The request message identifies the application and a login interaction. When the execution system at the server system receives the request for the application and the login interaction, it invokes the controller to perform the login interaction of the identified application. The login interaction prepares a web page to return to the client system.

Figure 5:
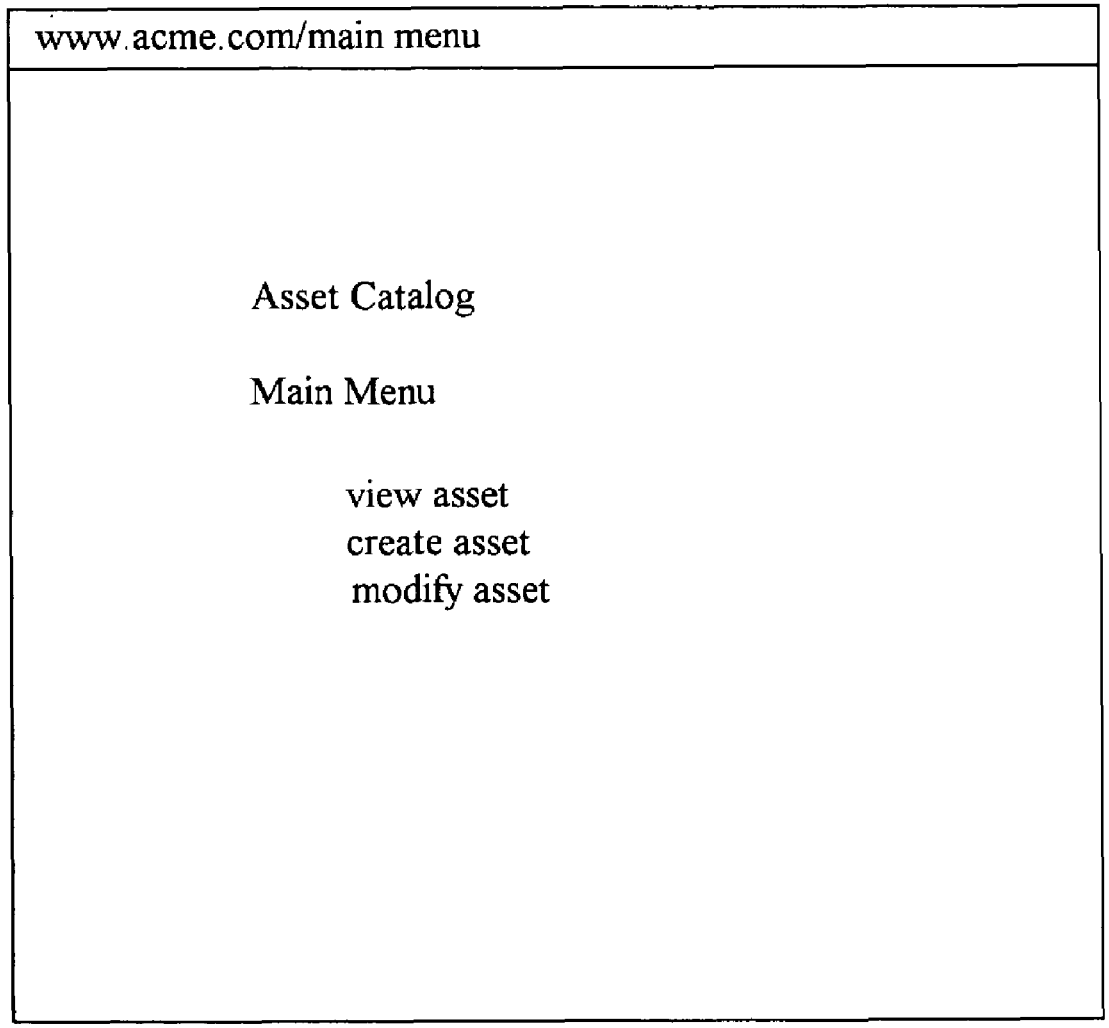
FIG. 5 illustrates a web page that specifies the menu items of the asset catalog application.

FIG. 4 illustrates a web page for logging in that is provided by the login interaction of the maintain asset catalog application. This web page prompts the user to enter their username and password and to select the submit button. When the submit button is selected, an HTTP-request message is sent that identifies the asset catalog application, the do-login interaction, and the user name and password. When the execution system receives the request, it invokes the controller to perform the do-login interaction of the asset catalog application. The do-login interaction prepares a web page to return to the client system FIG. 5 illustrates a web page that specifies the menu items of the asset catalog application, which is provided by the do-login interaction. In this example, the menu items are view asset, create asset, and modify asset. When the user selects the create asset menu item, an HTTP-request message is sent that identifies the asset catalog application and the create asset interaction. When the execution system receives the request, it invokes the controller to perform the create-asset interaction of the asset catalog application. That interaction prepares a web page for entry of the attributes of an asset.

FIG. 6 illustrates a web page for entry of asset attributes that is provided by the create-asset interaction of the asset catalog application. The web page provides various fields for the user to specify various attributes of an asset. When the user selects the create asset button, an HTTP-request message is sent that identifies the asset catalog application, the do-create-asset interaction, and the attribute values entered by the user into the web page.

When the execution system receives the request, it invokes the controller to perform the do-create-asset interaction to effect of the creation of an asset catalog entry for the specified asset with the attribute values entered by the user.

In one embodiment, the interactions of an application are specified in an XML ("Extensible Markup Language") file. (One skilled in the art will appreciate that the information defining interactions may be stored in various formats, such as being stored in a relational database.) Table 1 contains the document type definition ("DTD") for an application program in one embodiment. The document type definition specifies in the syntax of the XML file that defines an application by specifying the tags of the XML file and their associated attributes. Lines 1–4 define the application tag, which is the root tag of the XML file. The application tag can include translator, command, view, and interaction tags, which are described below. The application tag includes a name attribute that specifies the name of the application.

Lines 6–11 define the translator tag. A translator is an object that provides a prepare method and an extract method for processing an object instantiated by the execution system to perform a command. Each command may specify the translator that is to be used for that command. If the command does not specify a translator, then a default translator is used. The name attribute of the translator tag is a logical name used by a command tag to specify the translator for that command. The class attribute of the translator tag identifies the class for the translator object. The default attribute of the translator tag indicates whether this translator is the default translator that is used when a command does not specify a translator.

Lines 13–16 define the translator-ref tag. The translator-ref tag is used in a command tag to refer back to the translator to be used with the command. The name attribute of the translator-ref tag identifies the name of the translator to be used by the command.

Lines 18–22 define the command tag. A command tag may include translator-ref tags and attribute tags. The translator-ref tag specifies the name of the translator to be used by this command. The attribute tags specify information relating to attributes of the command. The name attribute of the command tag provides the name of the command, which is used by the command-ref tag to refer to the command. The class attribute of the command tag provides the name of the object class that implements the behavior of the command.

Lines 24–28 define the command-ref tag. The command-ref tag is used by the interaction tag to specify the commands within the interaction. The command reference tag may include attribute tags. The name attribute of the command-ref tag specifies the logical name of the command as specified in a command tag. The type attribute of the command-ref tag specifies whether the command should be performed even if an exception occurs earlier in the interaction. The value of "finally" means that the command should be performed.

Lines 30–37 define an attribute tag. The attribute tag defines how attributes of a command are processed. The name attribute of the attribute tag specifies the name of an attribute. The value attribute of the attribute tag specifies a value for the attribute. That value is to be used when the command is invoked to override the current value for that attribute in the attribute store. The get-name attribute of the attribute tag specifies an alternate name for the attribute when getting an attribute value from the attribute store. The set-name attribute of the attribute tag specifies an alternate name for the attribute when setting an attribute value in the attribute store. The get-name and set-name attributes effectively implement an aliasing mechanism for attribute names. The scope attribute of the attribute tag specifies whether the scope of the attribute is application, request (or interaction), or session.

Lines 39–45 define a view tag. A view tag defines a view. The name attribute of the view tag specifies the name of the view, which is used by the view-ref tag to refer to a view. The target attribute of a view tag specifies the JSP target of a view. The type attribute of the view tag specifies whether the view should be invoked when there is an error. The default attribute of the view tag specifies whether this view is the default view that is used when an interaction does not explicitly specify a view.

Lines 47–50 define the view-ref tag. The view-ref tags are included in interaction tags to specify that the associated view is to be included in the interaction. The name attribute of the view-ref tag specifies the name of the referenced view as indicated in a view tag.

Lines 52–55 define tags used for conditional analysis of commands or views. A conditional tag may include an if tag, an else if tag, an else tag, a command-ref tag, a view-ref tag, and a conditional tag. The data of the if tag and the else if tag specify a condition (e.g., based on attribute values in the attribute store) that specify the commands or view that are to be conditionally performed when executing an interaction.

Lines 57–60 define the interaction tag. An interaction tag defines a sequence of command, view, or conditional tags that define an interaction. The interaction tag may include command-ref, view-ref and conditional tags. The name attribute of the interaction tag identifies the name of the interaction, which is used to identify the interaction to invoke when a request is received. The requests specify the name of the interaction.

TABLE 1

```
1.  <!ELEMENT application (translator*,command*,view*,
        interaction*)>
2.  <!ATTLIST application
3.  name        ID       #REQUIRED
4.  >
5.
```

TABLE 1-continued

```
6.  <!ELEMENT translator EMPTY>
7.  <!ATTLIST translator
8.  name        ID       #REQUIRED
9.  class       CDATA    #REQUIRED
10. default     (true|false) "false"
11. >
12.
13. <!ELEMENT translator-ref EMPTY>
14. <!ATTLIST translator-ref
15. name        IDREF #REQUIRED
16. >
17.
18. <!ELEMENT command (translator-ref*, attribute*)>
19. <!ATTLIST command
20. name        ID       #REQUIRED
21. class       CDATA    #REQUIRED
22. >
23.
24. <!ELEMENT command-ref (attribute*)>
25. <!ATTLIST command-ref
26. name                 IDREF #REQUIRED
27. type        (default|finally) "default"
28. >
29.
30. <!ELEMENT attribute EMPTY>
31. <!ATTLIST attribute
32. name        ID       #REQUIRED
33. value       CDATA    #IMPLIED
34. get-name    CDATA    #IMPLIED
35. set-name    CDATA    #IMPLIED
36. scope       (application|request|session) "request"
37. >
38.
39. <!ELEMENT view>
40. <!ATTLIST view
41. name        ID       #REQUIRED
42. target      CDATA    #REQUIRED
43. type        (default|error) "default"
44. default     (true|false) "false"
45. >
46.
47. <!ELEMENT view-ref>
48. <!ATTLIST view-ref
49. name        IDREF #REQUIRED
50. >
51.
52. <!ELEMENT if (#PCDATA)>
53. <!ELEMENT elsif (#PCDATA)>
54. <!ELEMENT else EMPTY>
55. <!ELEMENT conditional (if?, elsif*, else*, command-ref*, view-
        ref*, conditional*)>
56.
57. !ELEMENT interaction (command-ref*,view-ref*,conditional*)>
58. <!ATTLIST interaction
59. name        ID       #REQUIRED
60. >
```

Table 2 provides an example XML file that defines an application. The application is the asset catalog application described above. Line 1 includes an application tag with the name of the application. Lines 2–3 specify the default translator for the application. Lines 5–11 define the various commands associated with the application. For example, as indicated by line 7, the command named "login" is associated with the class "demo.cb.Login." Whenever a login command is performed, an object of class "demo.cb.Login" is used to provide the behavior. Lines 13–20 define the views of the application. For example, line 14 illustrates that the view named "view-asset" is invoked by invoking the target named "html/view-asset.jsp." Lines 23–98 define the various interactions that compose the application. For example, lines 42–53 define the "view-asset" interaction.

The interaction includes command-ref tags for each command defined in the interaction. The conditional tag at lines 47–52 defines a conditional view. In this example, if the user has administrator permission, then the "view-asset-admin" view is invoked, else the "view-asset" view is invoked. Lines 88–90 illustrate the use of an attribute tag used within a command tag. The attribute tag indicates that the attribute named "object" that is an input attribute of the command corresponds to the attribute named "asset" in the attribute store.

TABLE 2

```
1.   <application name="asset catalog">
2.   <translator name="default-trans" class="com.ge.dialect.cb.
     DefaultTranslator"
3.   default="true"/>
4.
5.   <command name="app-ctx" class="demo.cb.AppCtx"/>
6.   <command name="begin-tx" class="demo.cb.BeginTx"/>
7.   <command name="login" class="demo.cb.Login"/>
8.   <command name="load-asset" class="demo.cb.LoadAsset"/>
9.   <command name="compose-asset" class="demo.cb.Compose
     Asset"/>
10.  <command name="store-object" class="demo.cb.StoreObject"/>
11.  <command name="end-tx" class="demo.cb.EndTx"/>
12.
13.  <view name="error-view" target="html/error.jsp" type=
     "error" default="true"/>
14.  <view name="view-asset" target="html/view-asset.jsp"/>
15.  <view name="view-asset-admin" target="html/view-asset-
     admin.jsp"/>
16.  <view name="create-asset" target="html/create-asset.jsp"/>
17.  <view name="modify-asset" target="html/modify-asset.jsp"/>
18.  <view name="login" target="html/login.jsp"/>
19.  <view name="login-error" target="html/login.jsp" type=
     "error"/>
20.  <view name="main-menu" target="html/main-menu.jsp"/>
21.
22.
23.  <interaction name="login">
24.     <view-ref name="login"/>
25.  </interaction>
26.
27.  <interaction name="do-login">
28.    <command-ref name="app-ctx"/>
29.    <command-ref name="begin-tx"/>
30.    <command-ref name="login">
31.       <attribute name="loginUser" scope="session"/>
32.    </command-ref>
33.    <command-ref name="end-tx" type="finally"/>
34.    <view-ref name="main-menu"/>
35.    <view-ref name="login-error"/>
36.  </interaction>
37.
38.  <interaction name="main-menu">
39.     <view-ref name="main-menu"/>
40.  </interaction>
41.
42.  <interaction name="view-asset">
43.    <command-ref name="app-ctx"/>
44.    <command-ref name="begin-tx"/>
45.    <command-ref name="load-asset"/>
46.    <command-ref name="end-tx" type="finally"/>
47.    <conditional>
48.       <if>(loginUser != void) && loginUser.
          hasPermission("admin")</if>
49.          <view-ref name="view-asset-admin"/>
50.       <else/>
51.          <view-ref name="view-asset"/>
52.    </conditional>
53.  </interaction>
54.
55.  <interaction name="create-asset">
56.                 <view-refname="create-asset"/>
57.  </interaction>
58.
59.  <interaction name="do-create-asset">
60.    <command-ref name="app-ctx"/>
61.    <command-ref name="begin-tx"/>
62.    <command-ref name="compose-asset"/>
63.    <command-ref name="store-object">
64.       <attribute name="object" get-name="asset"/>
```

TABLE 2-continued

```
65.    </command-ref>
66.    <command-ref name="end-tx" type="finally"/>
67.    <conditional>
68.       <if>(loginUser != void) && loginUser.
          hasPermission("admin")</if>
69.          <view-ref name="view-asset-admin"/>
70.       <else/>
71.          <view-ref name="view-asset"/>
72.    </conditional>
73.  </interaction>
74.
75.  <interaction name="modify-asset">
76.    <command-ref name="app-ctx"/>
77.    <command-ref name="begin-tx"/>
78.    <command-ref name="load-asset"/>
79.    <command-ref name="end-tx" type="finally"/>
80.    <view-ref name="modify-asset"/>
81.  </interaction>
82.
83.  <interaction name="do-modify-asset">
84.    <command-ref name="app-ctx"/>
85.    <command-ref name="begin-tx"/>
86.    <command-ref name="load-asset"/>
87.    <command-ref name="compose-asset"/>
88.    <command-ref name="store-object">
89.       <attribute name="object" get-name="asset"/>
90.    </command-ref>
91.    <command-ref name="end-tx" type="finally"/>
92.    <conditional>
93.       <if>(loginUser != void) && loginUser.
          hasPermission("admin")</if>
94.          <view-ref name="view-asset-admin"/>
95.       <else/>
96.          <view-ref name="view-asset"/>
97.    </conditional>
98.  </interaction>
99.
100. </application>
```

Verification System

Figure 7:
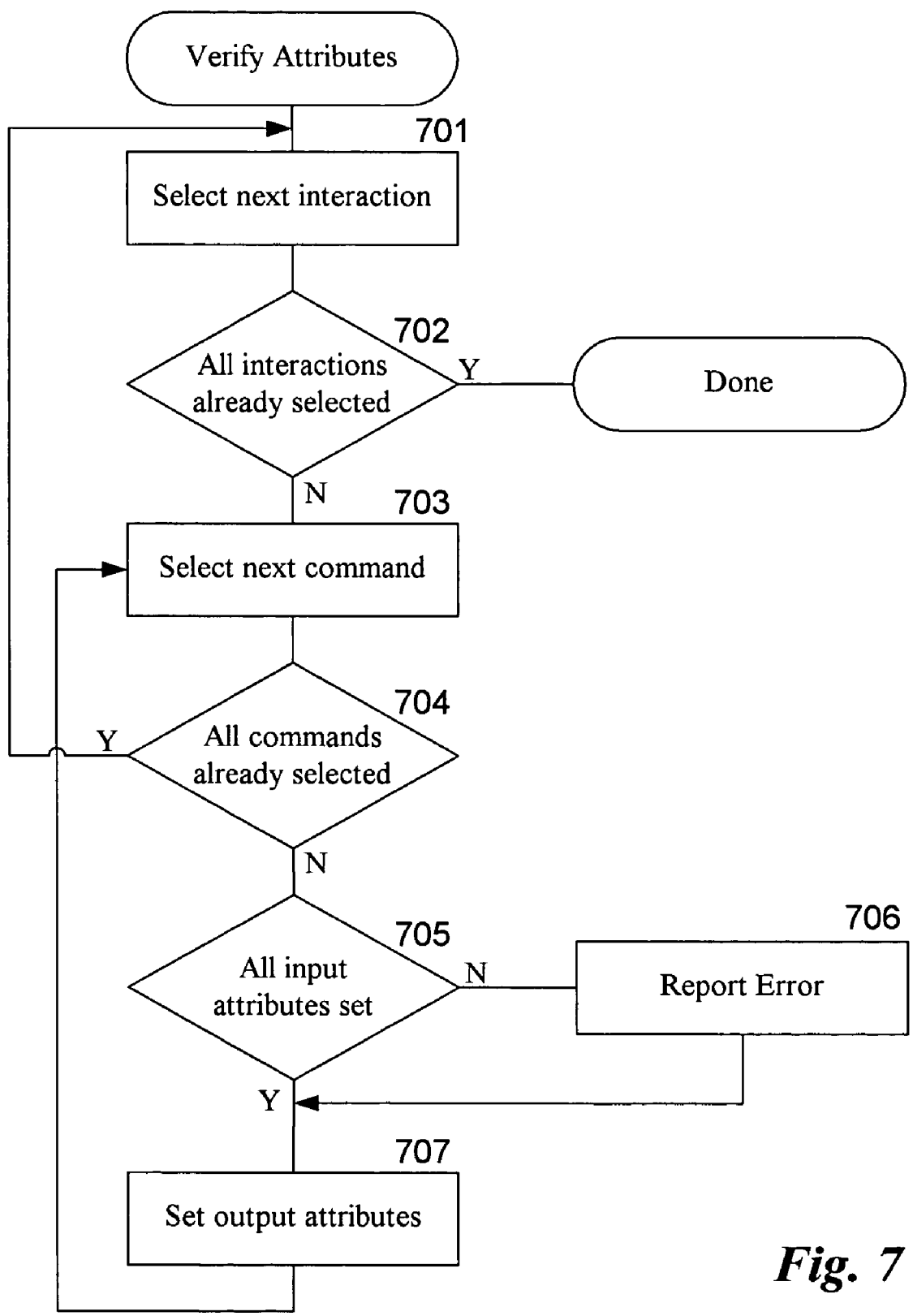
FIG. 7 is a flow diagram illustrating the overall processing of the verification system in one embodiment.

FIG. 7 is a flow diagram illustrating the overall processing of the verification system in one embodiment. The verification system inputs an interaction-based application program and verifies whether the input attributes of each command of each interaction would be properly resolved at runtime. The verification system may be provided with a specification of a path of execution of the application. A path of execution specifies a sequence of interactions that may be executed by the program at runtime. For example, a path of execution through the asset catalog application might be "login," "do-login," "main-menu," "view-asset," "main-menu," "modify-asset," and "do-modify-asset." In one embodiment, the verification system may identify possible sequences of interactions and allow the user of the verification system to select a sequence to have verified by the verification. One skilled in the art would appreciate that once an interaction (or even a command) is invoked in a path of execution, then subsequent invocations will not result in the resolution of any new output attributes. Thus, a path of execution need only be analyzed up to the point where all interactions of that path would have been already invoked at least once each. Alternatively, the verification system may verify all possible paths of execution or simply verify a path of execution whose sequence of interaction is defined by the user. In blocks 701–707, the verification system loops selecting each interaction of the path of execution of the application. In block 701, the verification system selects the next interaction of the path of execution, starting with the first interaction. In decision block 702, if all the interactions of the path of execution have already been selected, then the verification system completes, else the verification system continues at block 703. In blocks 703–707, the verification system loops selecting each command of the selected interaction. In block 703, the verification system selects the next command of the selected interaction, starting with the first command. In decision block 704, if all the commands have already been selected, then the verification system loops to block 701 to select the next interaction, else the verification system continues at block 705. In decision block 705, if all the output attributes corresponding to the input attributes of the selected command would be resolved at runtime as previously indicated in block 707, then the input attributes are verified as being resolved and the verification system continues at block 707, else the verification system continues at block 706. In one embodiment, the verification system may use an attribute store type data structure to indicate attributes that would be resolved. In which case, the verification system would check the current contents of the attribute store to see if the input attributes have been resolved. In block 706, the verification system reports which input attributes have not been resolved and continues at block 707. In block 707, the verification system notes (e.g., by adding the attribute name to the attribute store) that the output attributes of the selected command would be resolved during runtime and then loops to block 703 to select the next command.

Figure 8:
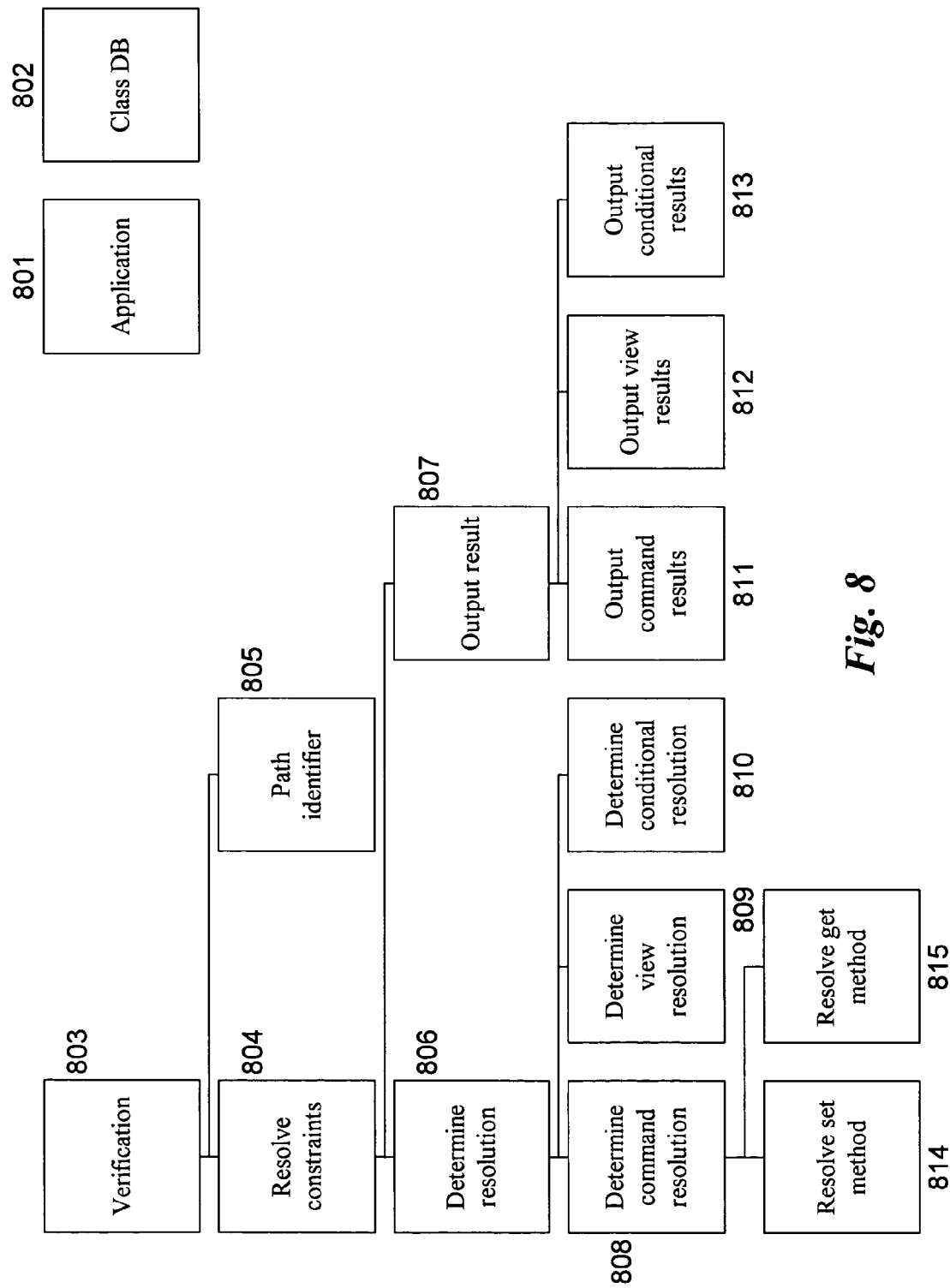
FIG. 8 is a block diagram illustrating components of the verification system in one embodiment.

FIG. 8 is a block diagram illustrating components of the verification system in one embodiment. The verification system executes on a computer system that may include a central processing unit, memory, input devices (e.g., keyboard and pointing device), output devices (e.g., display devices), and storage devices (e.g., disk drives). The memory and storage devices are computer readable media that may contain computer instructions that implement the verification system. The input to the verification system includes an application computer program 801 and class definitions 802. The application is an interaction-based program to be verified by the verification system, and the class definitions provide the specification of the input and output attributes associated with the commands of the application. Blocks 803–815 provide a hierarchical representation of the components of the verification system. The verification component 803 invokes the path identifier component 805 and the resolve constraints component 804 to identify a path of execution and determine whether the input attributes associated with that path of execution will be properly resolved during runtime. The resolve constraints component invokes the determine resolution component 806 and the output resolution component 807 to determine the resolutions for the input attributes and to output the results of the determination. The determine resolution component creates an attribute information list that includes an attribute information entry for each attribute of each command encountered in the path of execution. The entries are ordered according to when the commands are encountered. The attribute information entries identify the name of the attributes, the direction (input or output), the name of the command, and whether the attribute would be resolved when that command would be performed. The output results component generates its output based on the attribute information list. The determine resolutions component invokes the determine command resolution component 808, the determine view resolution component 809, and the determine conditional resolution component 810 to selectively determine the resolution of attributes associated with a command, view, or conditional of an interaction. In one embodiment, the determine view resolution and determine final resolution components do not verify any attributes, rather these components only add an entry to the attribute information list to indicate the order in which the viewer conditional was encountered. Alternatively, a view may have an object with attributes associated with it, in which case the verification system would verify the resolution of those attributes. Also, the verification system may verify the resolution of attributes used in an expression of a conditional. The determine command resolution component identifies the input and output attributes of command and invokes the resolve set method component 814 and the resolve get method component 815 to determine the resolution of each identified attribute. The resolve set method component determines whether the input attribute associated with that set method will be properly resolved at runtime. The resolve get method component establishes that the output attribute will be resolved at runtime. The output results component invokes the output command results component 811, the output view results component 812, and the output conditional results component 813 to output the results identified by the determine resolution component as indicated by the attribute information list.

Figure 9:
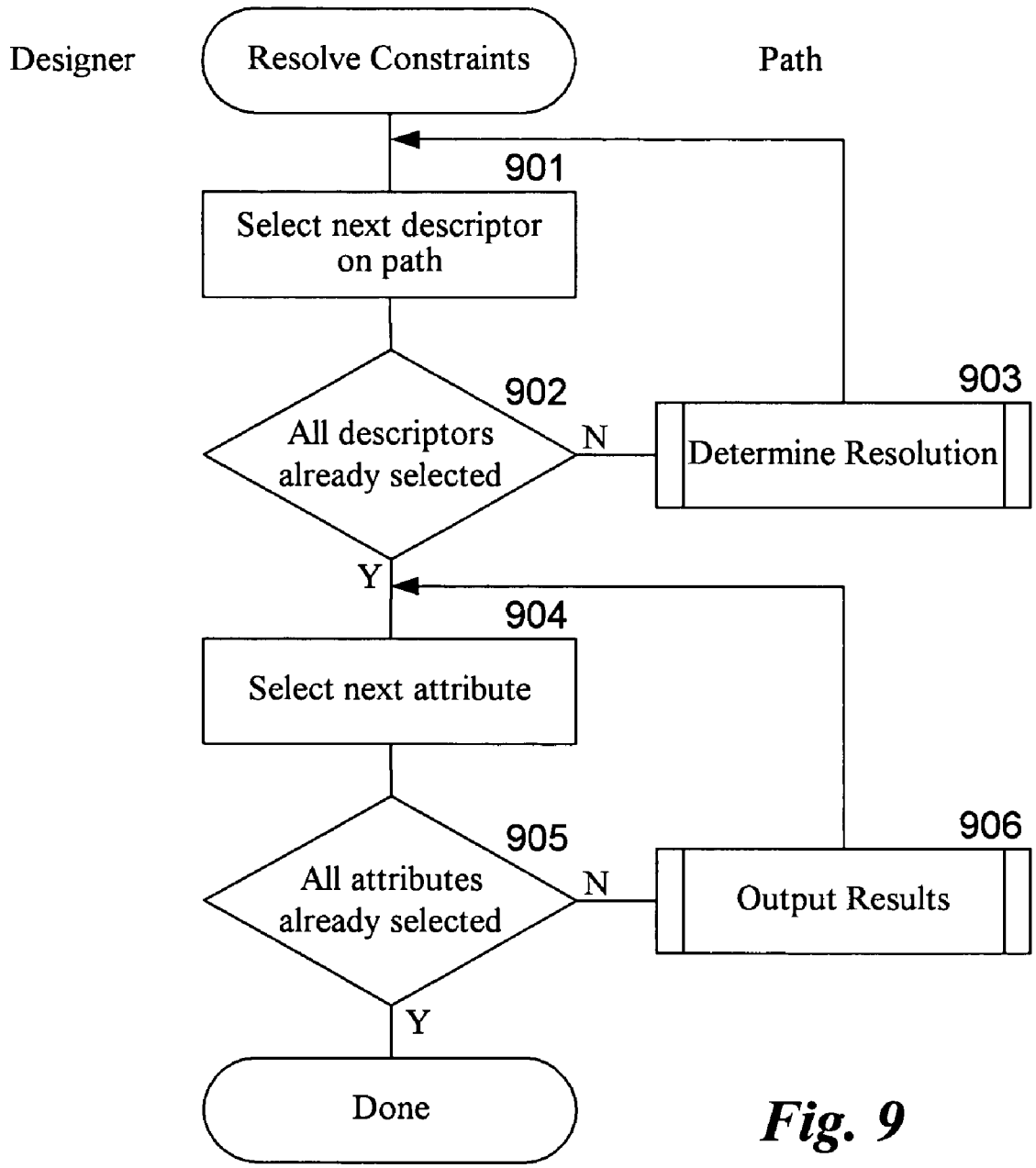
FIG. 9 is a flow diagram illustrating the processing of the resolve constraints component in one embodiment.

FIGS. 9–17 are flow diagrams illustrating the processing of the components of the verification system in one embodiment. FIG. 9 is a flow diagram illustrating the processing of the resolve constraints component in one embodiment. The component is passed a path of execution through an application and determines whether each descriptor (i.e., command, view, or conditional) would have its input attributes properly resolved at runtime and then outputs the results of that determination. In block 901, the component selects the next descriptor on the path of execution starting with the first. In decision block 902, if all the descriptors on the path of execution have already been selected, then the component continues at block 904, else the component continues at block 903. In block 903, the component invokes the determine resolution component passing the selected descriptor and then loops to block 901 to select the next descriptor on the path of execution. The determine resolution component creates the attribute information list for the path of execution that indicates whether the attributes of the commands on the path of execution would be resolved or not during runtime. In block 904, the component selects the next attribute information entry in the attribute information list, starting with the first. In decision block 905, if all the entries have already been selected, then the component completes, else the component continues at block 906. In block 906, the component invokes the output results component passing the selected attribute information entry to output the result information associated with the selected attribute. The component then loops to block 904 to select the next attribute information entry.

Figure 10:
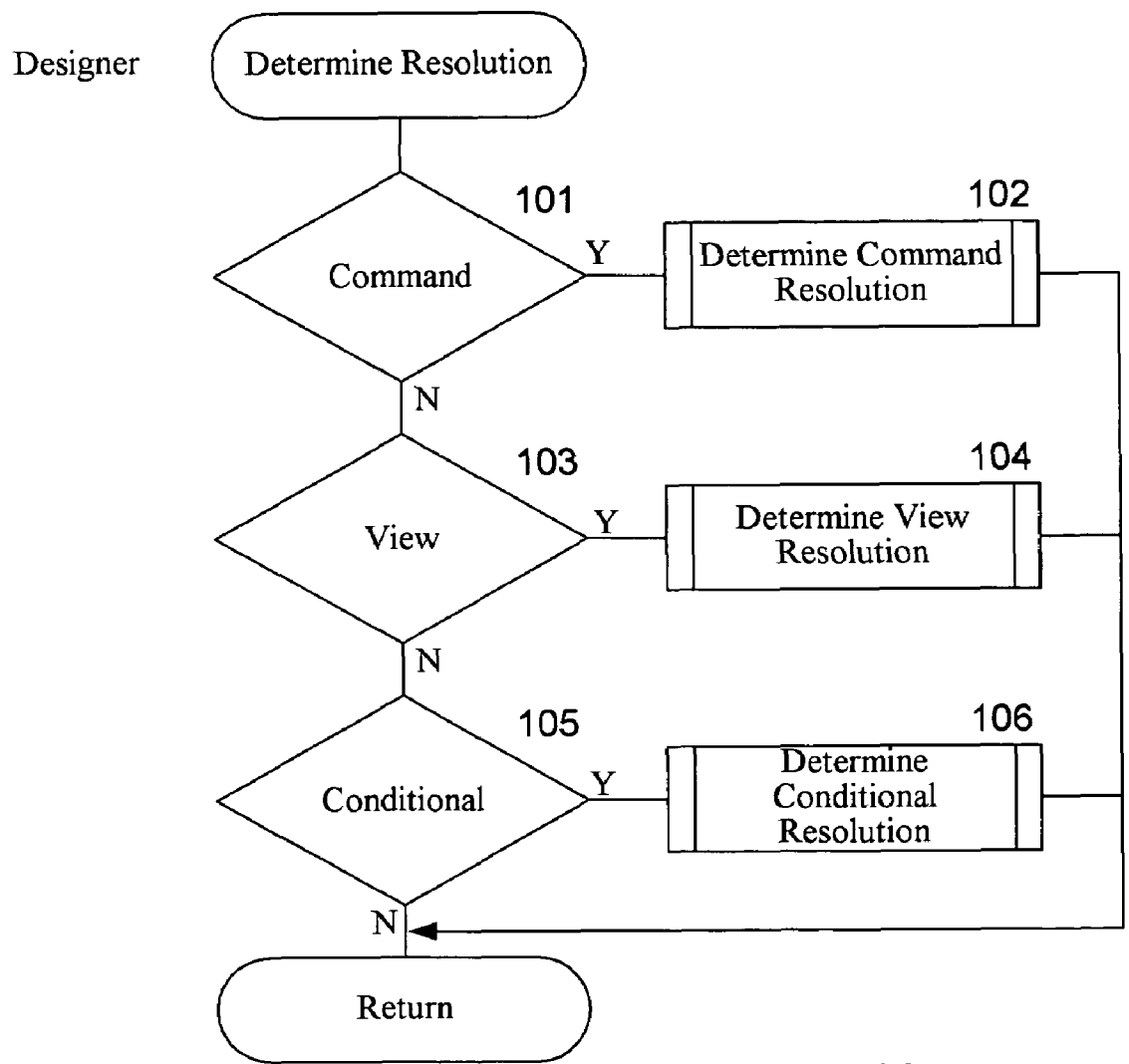
FIG. 10 is a flow diagram illustrating the processing of the determine resolution component in one embodiment.

FIG. 10 is a flow diagram illustrating the processing of the determine resolution component in one embodiment. The determine resolution component is passed a descriptor (e.g., command, view, or conditional) and determines whether the input attributes associated with the descriptor would be properly resolved at runtime. In decision block 1001, if the descriptor is a command, then the component continues at block 1002, else the component continues at block 1003. In block 1002, the component invokes the determine command resolution component to determine the resolution of the attributes of the passed command and then returns. In decision block 1003, if the descriptor is a view, then the component continues at block 1004, else the component continues at block 1005. In block 1004, the component invokes the determine view resolution component to determine the resolution of the attributes of the passed view and then returns. In decision block 1005, if the descriptor is a conditional, then the component continues at block 1006. In block 1006, the component invokes the determine conditional resolution component to determine the resolution of the attributes of the conditional. The component then returns.

Figure 11:
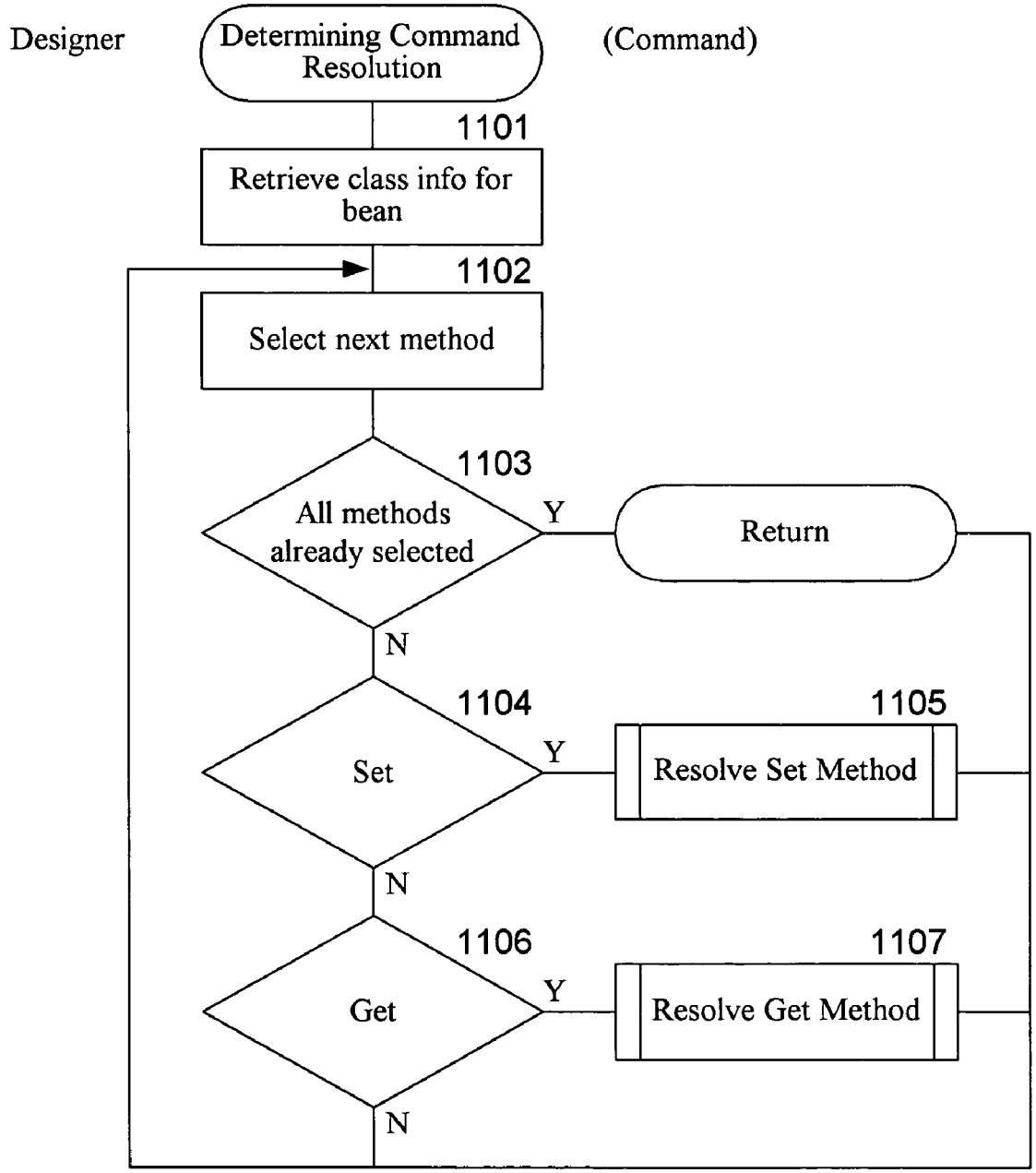
FIG. 11 is a flow diagram illustrating the processing of the determine command resolution component in one embodiment.

FIG. 11 is a flow diagram illustrating the processing of the determine command resolution component in one embodiment. This component is passed a command and determines whether the input attributes of that command would be resolved properly at runtime and sets the resolution of the output attributes of that command. The component maintains a resolved list of output attributes that have been resolved. If an output attribute corresponding to an input attribute is in the resolved list, then the input attribute is properly resolved. In block 1101, the component retrieves the class information for the passed command. The class information defines the signature of each method of the object that implements the passed command. In blocks 1102–1107, the component loops selecting each method of the passed command and determining whether the selected method corresponds to an input attribute or an output attribute. In block 1102, the component selects the next method of the passed command, starting with the first. In decision block 1103, if all the methods of the passed command have already been selected, then the component returns, else the component continues at block 1104. In decision block 1104, if the selected method is a set method, then the component continues at block 1105, else the component continues at block 1106. In block 1105, the component invokes the resolve set method component to determine whether the value for the input attribute of the selected method would be resolved at runtime. The component then loops to block 1102 to select the next method. In decision block 1106, if the selected method is a get method, then the component continues at block 1107, else the component loops to block 1102 to select the next method. In block 1107, the component invokes the resolve get method component to establish that the value for the output attribute of the selected method would be resolved at runtime. The component then loops to block 1102 to select the next method.

Figure 12:
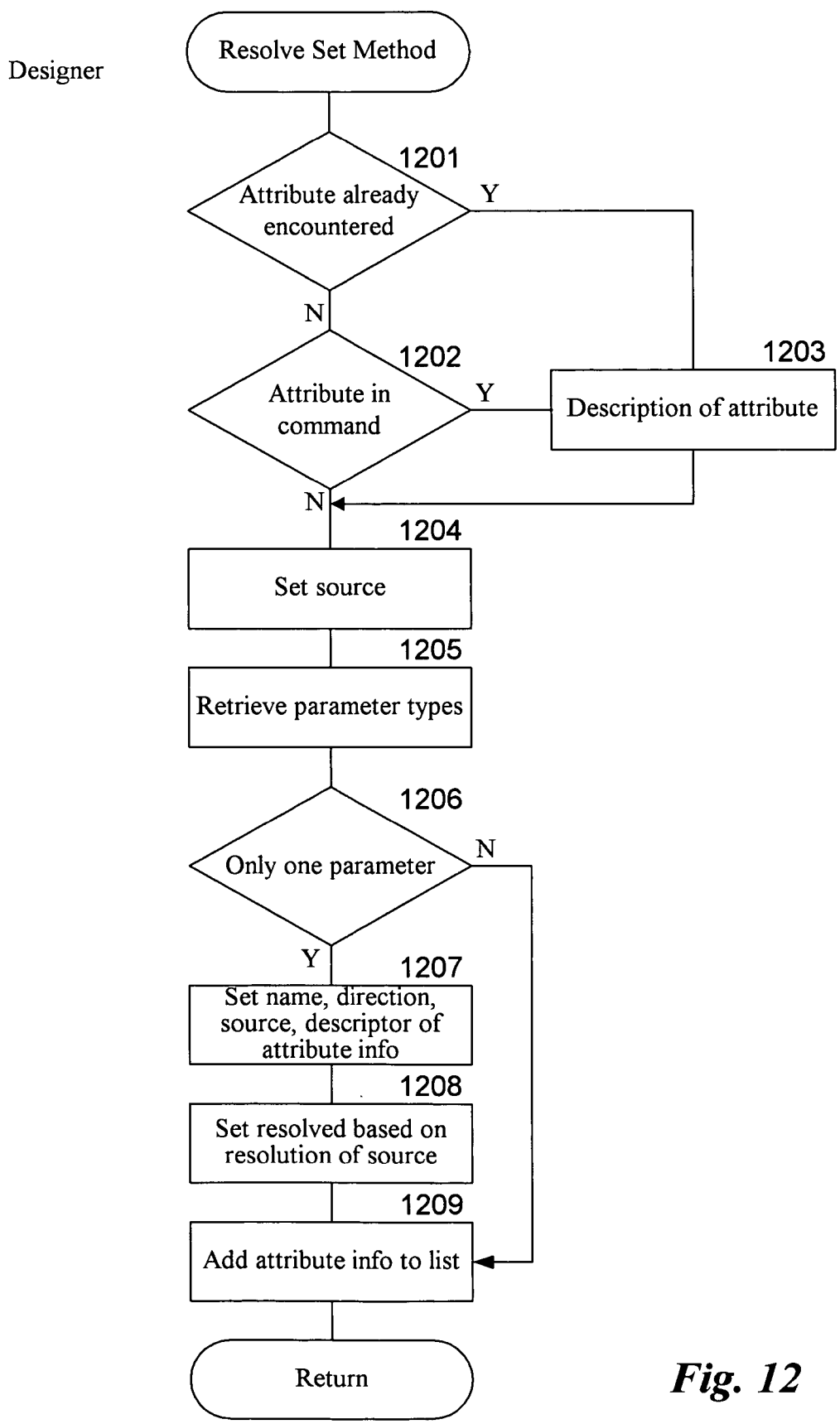
FIG. 12 is a flow diagram illustrating the processing of the resolve set method component in one embodiment.

FIG. 12 is a flow diagram illustrating the processing of the resolve set method component in one embodiment. The component is passed an indication of a set method and determines whether its value would be resolved at runtime based on the resolution of the source of its value. The component checks the resolved list to determine whether the input attribute would be resolved. In decision block 1201, if the input attribute has been encountered when processing a method of another command, then the component continues at block 1203, else the component continues at block 1202. In decision block 1202, if the input attribute is defined by the descriptor of the passed command (e.g., a "value" attribute of the descriptor), then the component continues at block 1203, else the component continues at block 1204. In block 1203, the component retrieves descriptive information relating to the input attribute from either the previous encounter or the descriptor. In block 1204, the component sets of the source to indicate the source of either the previously encountered input attribute or the input attribute defined in the descriptor. Otherwise, the source is set to the name indicated by the set method. In block 1205, the component retrieves the parameter types for the passed method. In decision block 1206, if the passed method has only one parameter, then it is a set method that can be processed by the verification system and the component continues at 1207, else the component returns. In block 1207, the component creates an attribute information entry associated with the input attribute of the currently selected command. The component sets the name, direction (i.e., input) of the attribute, and source of the attribute. In block 1208, the component sets the resolution of the attribute information entry to indicate whether the input attribute is resolved. The input attribute is resolved if the identified source is itself resolved as indicated by the resolved list. The verification system maintains a list of attributes that have been resolved. In block 1209, the component adds the attribute information entry to the attribute information list and then returns.

Figure 13:
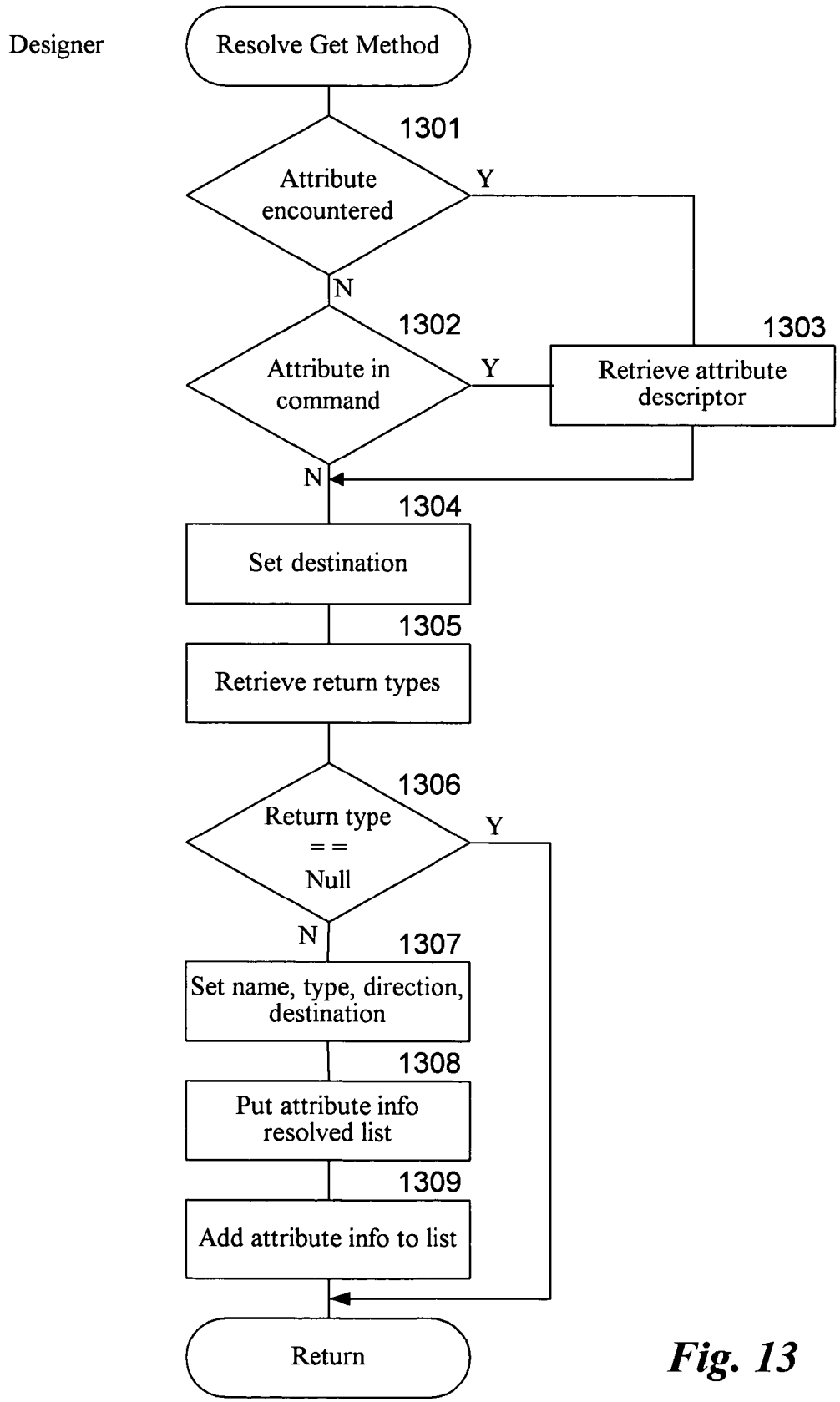
FIG. 13 is a flow diagram illustrating the processing of the resolve get method component in one embodiment.

FIG. 13 is a flow diagram illustrating the processing of the resolve get method component in one embodiment. The component is passed an indication of a get method and establishes that it would be resolved at runtime. In decision block 1301, if the output attribute has been encountered when processing a method of another command, then the component continues at block 1303, else the component continues at block 1302. In decision block 1302, if the output attribute is defined by the descriptor of the passed command, then the component continues at block 1303, else the component continues at block 1304. In block 1303, the component retrieves descriptive information relating to the output attribute based on the previous encounter or the descriptor. In block 1304, the component sets the destination associated with the output attribute. The destination may be the name specified from the previous encounter or the descriptor. Otherwise, it is the name specified in the get method. In block 1305, the component retrieves the return type associated with the passed get method. In decision block 1306, if the return type is null, then no values is returned by the passed get method and the component returns, else the component continues at block 1307. In block 1307, the component creates an attribute information entry and sets the name, type, direction (i.e., output) and destination associated with the output attribute. In block 1308, the component adds the attribute information entry to the list of resolved attributes. In block 1309, the component adds the attribute information entry to the attribute information list and then returns.

Figure 14:
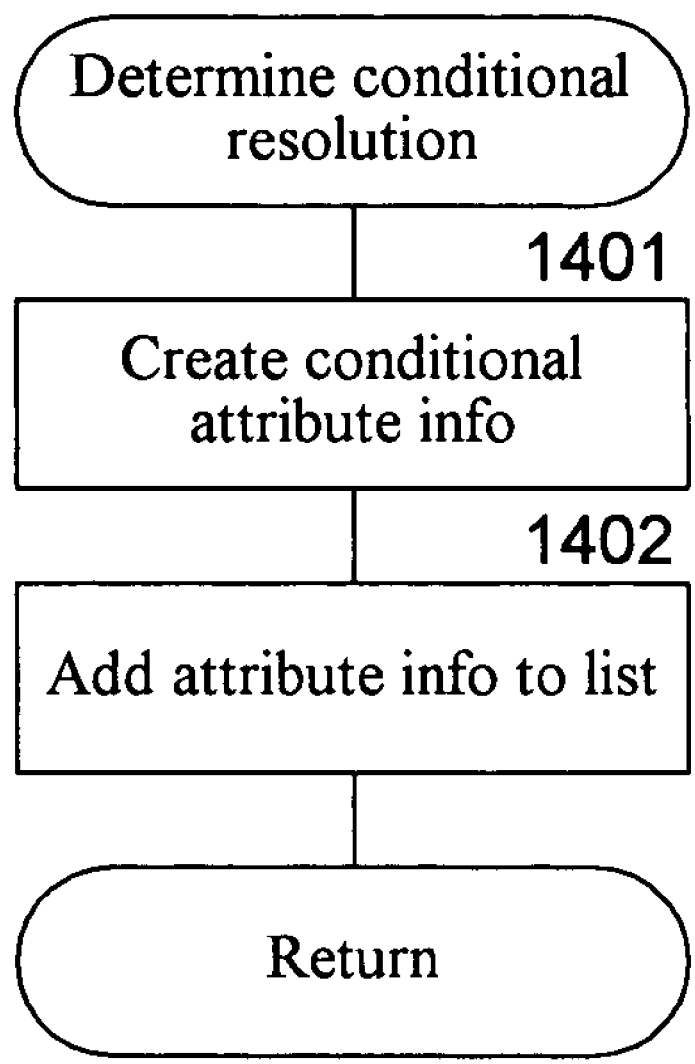
FIG. 14 is a flow diagram illustrating the processing of the determine conditional resolution component in one embodiment.

FIG. 14 is a flow diagram illustrating the processing of the determine conditional resolution component in one embodiment. In this embodiment, the component adds an attribute information entry to the attribute information list that identifies the conditional descriptor. In block 1401 component creates an attribute information entry for the conditional. In block 1402, the component adds the attribute information to the attribute information list and then returns.

Figure 15:
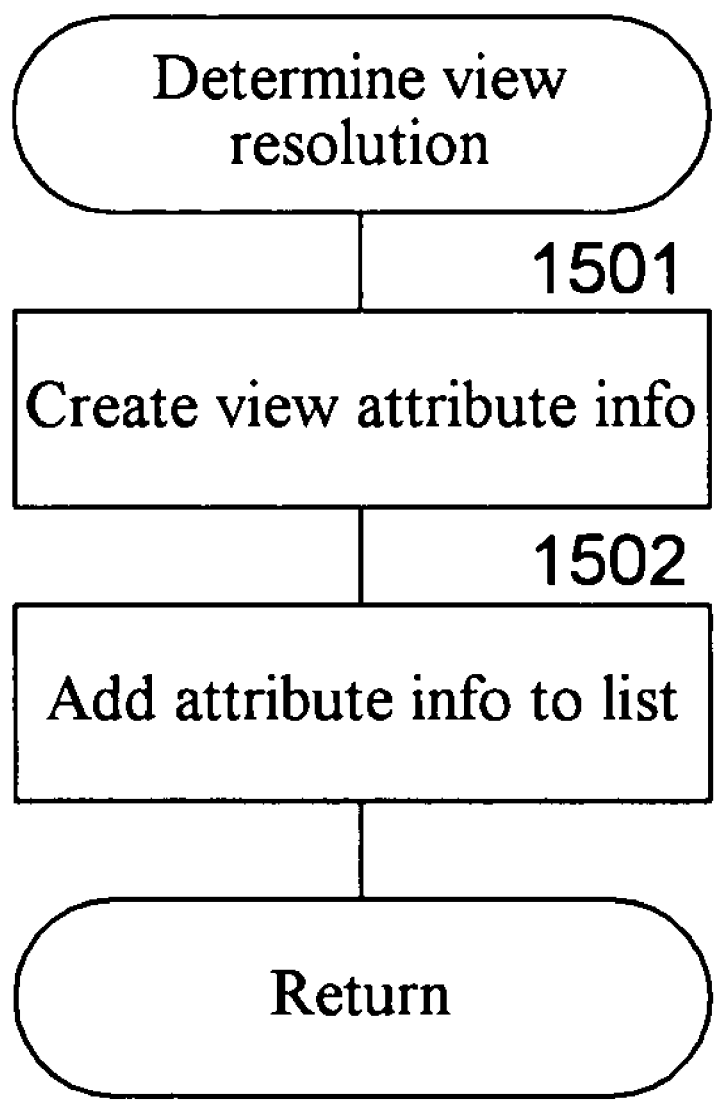
FIG. 15 is a flow diagram illustrating the processing of the determine view resolution component in one embodiment.
Figure 16:
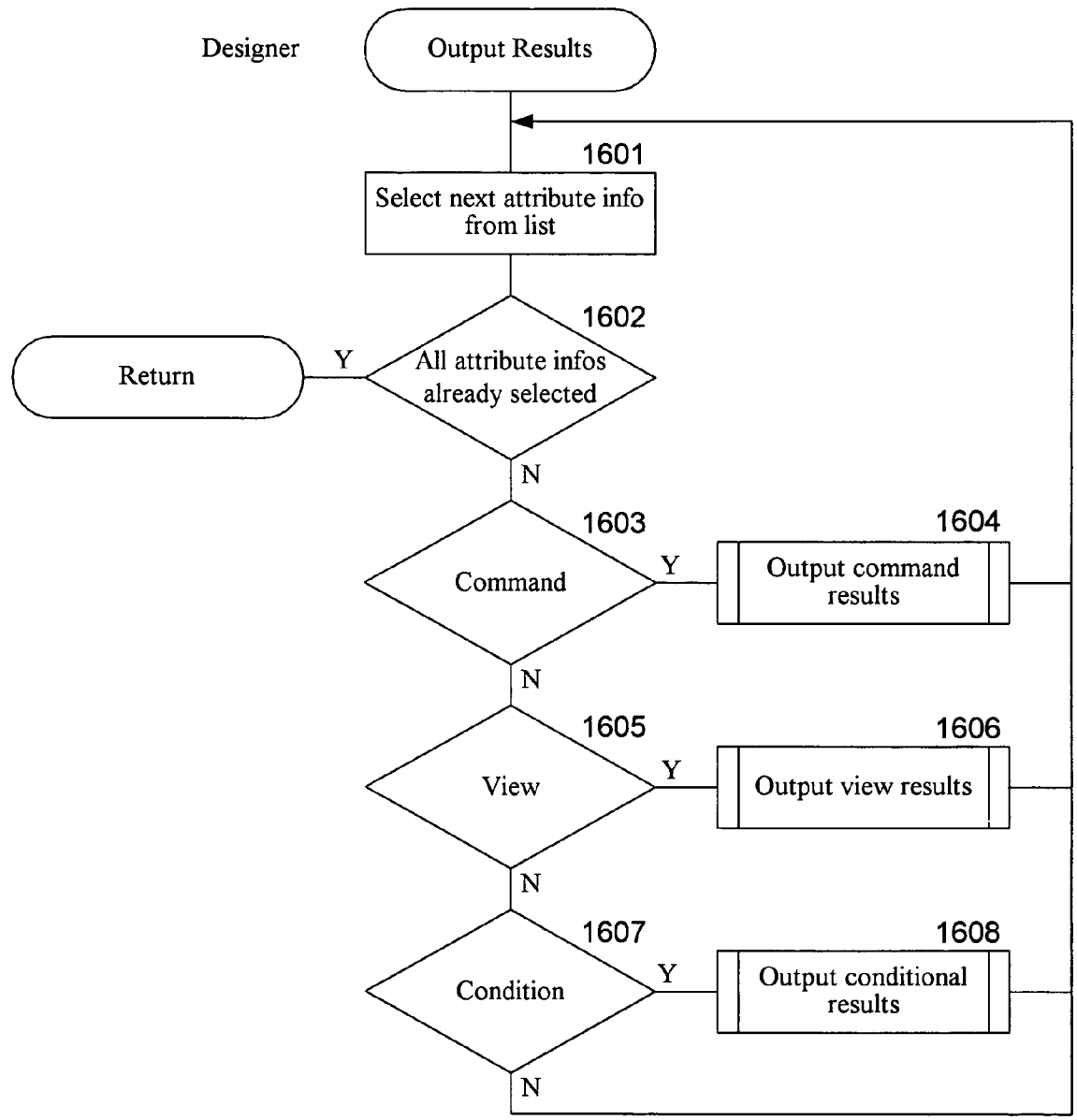
FIG. 16 is a flow diagram illustrating the processing of the output results component in one embodiment.

FIG. 15 is a flow diagram illustrating the processing of the determine view resolution component in one embodiment. In this embodiment, the component adds an attribute information entry to the attribute information list that identifies the view descriptor. In block 1501, the component creates an attribute information entry for the view. In block 1502, the component adds the attribute information to the attribute information list and then returns FIG. 16 is a flow diagram illustrating the processing of the output results component in one embodiment. The component loops processing the entries of the attribute information list and outputs information relating to the resolution associated with each attribute information entry. In block 1601, the component selects the next attribute information entry from the attribute information list, starting with the first. In decision block 1602, if all the attribute information entries have already been selected, then the component returns, else the component continues at block 1603. In decision block 1603, if the selected attribute information entry corresponds to a command, then the component continues at a block 1604 to invoke the output command results component, else the component continues at block 1605. In decision block 1605, if the selected attribute information entry corresponds to a view, then the component continues at block 1606 to output information relating to the view entry, else the component continues at block 1607. In decision block 1607, if the selected attribute information entry corresponds to a conditional, then the component continues at block 1608 to output information relating to the entry. The component then loops to block 1601 to select the next attribute information entry.

Figure 17:
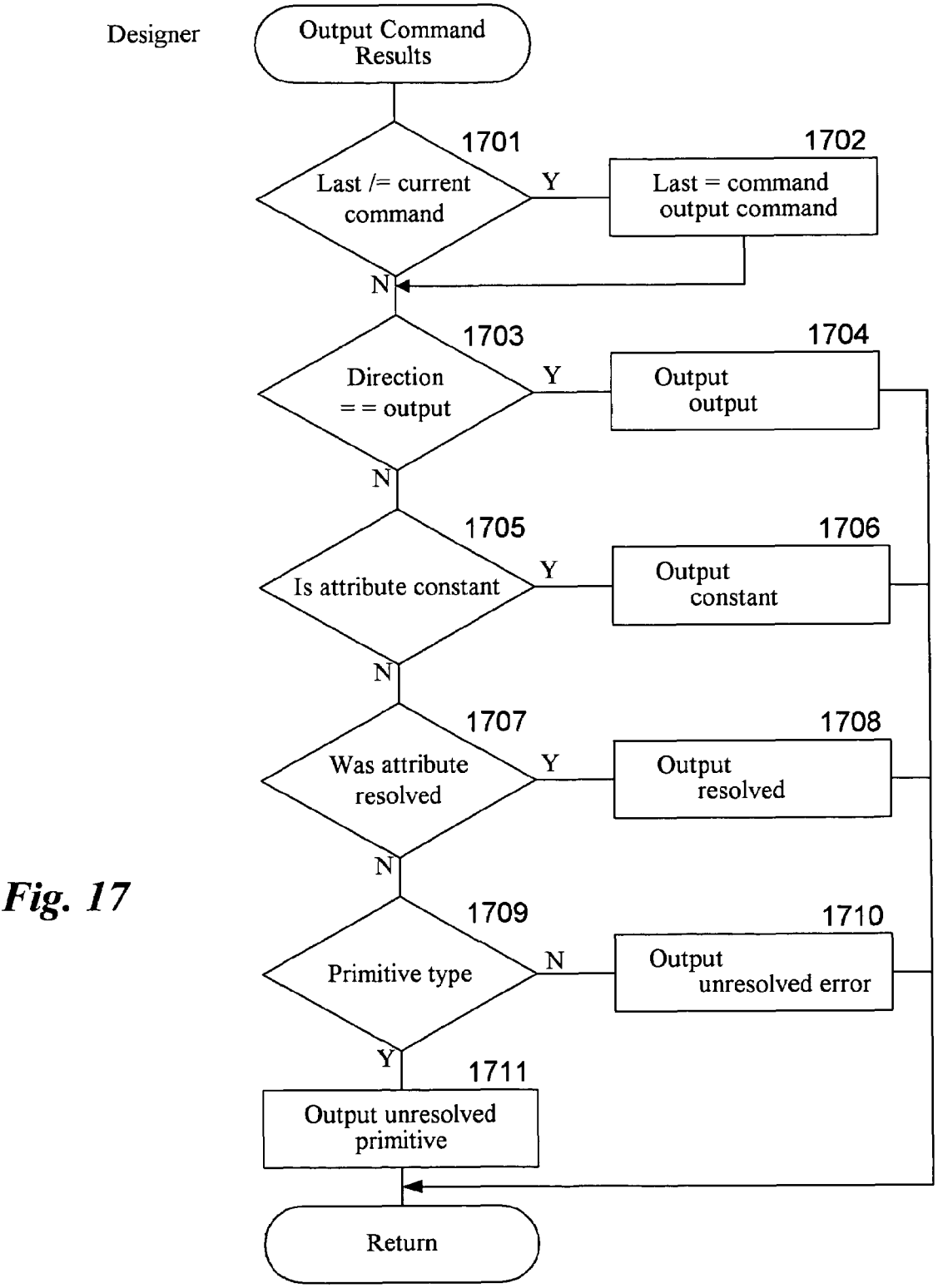
FIG. 17 is a flow diagram illustrating the processing of the output command results component in one embodiment.

FIG. 17 is a flow diagram illustrating the processing of the output command results component in one embodiment. The component is passed an attribute information entry and outputs information relating to that attribute information entry. In decision block 1701, if the attribute information entry corresponds to a different command than the previously processed command, then the component continues at block 1702, else the component continues at block 1703. In block 1702, the component outputs an indication that the attribute information entry corresponds to a new command and continues at block 1703. In decision block 1703, if the direction of the attribute information entry is output, then the component continues at block 1704, else the component continues at block 1705 to process the input attribute information. In block 1704, the component outputs information relating to an output attribute and then returns. In decision block 1705, if the attribute is a constant, as defined in the descriptor, then the component continues at block 1706, else the component continues at block 1707. In block 1706, the component outputs an indication that the input attribute is a constant and then returns. In decision block 1707, if the input attribute was resolved, then the component continues at block 1708, else the component continues at block 1709. In block 1708, the component outputs an indication that the input attribute was properly resolved and then returns. In decision block 1709, if the input attribute is a primitive type (e.g., integer or string), then the component continues at block 1711, else the component continues at block 1710. If the input attribute is a primitive type, then the value for the attribute may be input at runtime by a user. Complex attribute types, however, cannot typically be input by a user at runtime and thus cannot be resolved by the user. A complex attribute type may be a data structure returned by a begin transaction command that specifies the database context for the transaction. In block 1710, the component outputs an unresolved error for the input attribute and then returns. In block 1711, the component outputs an unresolved primitive indication for the input attribute and then returns.

The verification system may operate to suppress reporting of input attributes that may be resolved by user input and/or to suppress reporting of input attributes of primitive types.

From the above description, it will be appreciated that although specific embodiments of the verification system have been described for purposes of illustration, various modifications may be made without deviating from the scope of the invention. For example, the verification component may additionally track the scope of attributes to provide a more accurate indication of resolution. Also, the verification system be used to verify the resolution of any computer program that has function invocations and parameters. Accordingly, the invention is not limited except by the following claims.

The invention claimed is:

1. A method in a computer system for determining resolution of attributes of a program, the method comprising:
   analyzing said program prior to runtime, said analyzing prior to runtime including:
     providing said program having interactions, each interaction having commands with attributes;
     identifying prior to runtime a sequence of interactions of the program; and for each interaction in the identified sequence,
       for each command of the interaction,
         for each input attribute of the command,
           identifying prior to runtime an output attribute corresponding to the input attribute; and
           indicating prior to runtime that the input attribute is resolved if the identified output attribute has been indicated as resolved, and indicating prior to runtime that the input attribute is not resolved if the identified output attribute has not been indicated as resolved; and
         for each output attribute of the command, indicating prior to runtime that the output attribute is resolved.

2. The method of claim 1 including reporting input attributes whose resolution is set to unresolved.

3. The method of claim 2 including suppressing the reporting of input attributes that may be resolved by user input.

4. The method of claim 2 including suppressing the reporting of input attributes of primitive types.

5. A computer implemented method for verifying resolution of input parameters of functions of a computer program before executing the computer program, the method comprising:
   verifying resolution of input parameters of functions of a computer program before executing the computer program, the verifying including:
     providing, before executing the computer program, a path of execution of the computer program, the path of execution identifying a sequence of functions of the computer program; and
     for each function identified in the provided path of execution, processing the function by
       for each input parameter of the function, indicating before executing the program that the input parameter is resolved if a corresponding output parameter has been indicated as resolved as a result of a function in the path of execution having previously been processed; and
       for each output parameter of the function, indicating before executing the program that the output parameter is resolved.

6. The method of claim 5 wherein the computer program is a command-based application wherein the functions are methods of objects corresponding to the commands.

7. The method of claim 6 wherein the commands are organized into interactions.

8. The method of claim 6 wherein the parameters are attributes of the objects.

9. The method of claim 8 wherein the objects have set and get methods for setting and getting attribute values.

10. The method of claim 8 wherein the attribute values are set with an assignment statement.

11. The method of claim 6 wherein each object has a perform method for performing a behavior associated with the command.

12. The method of claim 5 wherein input and output parameters correspond when they have the same name.

13. The method of claim 5 including creating a list of each parameter of each function processed, the list indicating resolution of the parameter, and including outputting an indication of resolution of each parameter based on the created list.

14. The method of claim 5 wherein the computer program is specified by an interaction-based definition, wherein interactions include commands, and wherein each command has a corresponding object with attributes.

15. The method of claim 14 wherein each command is defined by a descriptor that optionally provides aliasing for names of attributes.

16. The method of claim 14 wherein each command is defined by a descriptor that optionally provides a constant value for an attribute.

17. A computer system, comprising:
means for verifying resolution of input parameters of functions of a computer program before executing the computer program, said means for verifying including:
means for selecting each function in execution order before executing the computer program; and
means for processing each selected function before executing the computer program by for each input parameter of the function, indicating that the input parameter is resolved if a corresponding output parameter has been indicated as resolved as a result of a function of the computer program having previously been processed and for each output parameter of the function, indicating that the output parameter is resolved.

18. The computer system of claim 17 wherein the computer program is a command-based application wherein the functions are methods of objects corresponding to the commands.

19. The computer system of claim 18 wherein the commands are organized into interactions.

20. The computer system of claim 18 wherein the parameters are attributes of the objects.

21. The computer system of claim 20 wherein the objects have set and get methods for setting and getting attribute values.

22. The computer system of claim 18 wherein each object has a perform method for performing a behavior associated with the command.

23. The computer system of claim 17 wherein input and output parameters correspond when they have the same name.

24. The computer system of claim 17 including means for creating a list of each parameter of each function processed, the list indicating resolution of the parameter, and including means for outputting an indication of resolution of each parameter based on the created list.

25. The computer system of claim 17 wherein the computer program is specified by an interaction-based definition, wherein interactions include commands and wherein each command has a corresponding object with attributes.

26. The computer system of claim 25 wherein each command is defined by a descriptor that optionally provides abasing for names of attributes.

27. The computer system of claim 25 wherein each command is defined by a descriptor that optionally provides a constant value for an attribute.

28. A computer-readable medium containing instructions for controlling a computer system by a method comprising:
determining prior to runtime resolution of parameters of functions of a computer program, said determining including:
identifying a path of execution of the computer program prior to runtime, the path of execution having functions of the computer program;
for functions in the identified path of execution,
indicating prior to runtime that an input parameter of the function is resolved if a corresponding output parameter has previously been indicated as resolved; and
indicating prior to runtime that an output parameter is resolved.

29. The computer-readable medium of claim 28 including indicating that an input parameter of a primitive type may be resolved by a user at runtime.

30. The computer-readable medium of claim 28 wherein the computer program is a command-based application where the functions are methods associated with objects corresponding to the commands.

31. The computer-readable medium of claim 30 wherein the commands are organized into interactions.

32. The computer-readable medium of claim 30 wherein the parameters are attributes of the objects.

33. The computer-readable medium of claim 32 wherein the objects have set and get methods for setting and getting attribute values.

34. The computer-readable medium of claim 28 wherein the computer program is specified by an interaction-based definition, wherein interactions include commands and wherein each command has a corresponding object with attributes.

35. The computer-readable medium of claim 34 wherein each command is defined by a descriptor that optionally provides aliasing for names of attributes.

36. The computer-readable medium of claim 34 wherein each command is defined by a descriptor that optionally provides a constant value for an attribute.

* * * * *